US011335197B2

(12) United States Patent
Jornod et al.

(10) Patent No.: US 11,335,197 B2
(45) Date of Patent: May 17, 2022

(54) TELEOPERATED DRIVING OF A VEHICLE

(71) Applicant: VOLKSWAGEN AKTIENGESELLSCHAFT, Wolfsburg (DE)

(72) Inventors: Guillaume Jornod, Berlin (DE); Andreas Pfadler, Berlin (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 17/078,587

(22) Filed: Oct. 23, 2020

(65) Prior Publication Data
US 2021/0125496 A1 Apr. 29, 2021

(30) Foreign Application Priority Data

Oct. 29, 2019 (EP) .................................... 19205894

(51) Int. Cl.
*G05D 1/00* (2006.01)
*G08G 1/0968* (2006.01)
*H04W 4/46* (2018.01)
*G08G 1/16* (2006.01)

(52) U.S. Cl.
CPC ............. *G08G 1/0968* (2013.01); *G08G 1/16* (2013.01); *H04W 4/46* (2018.02)

(58) Field of Classification Search
None
See application file for complete search history.

(56) References Cited

U.S. PATENT DOCUMENTS

| 2015/0264554 | A1  | 9/2015  | Addepalli et al. |
| 2018/0088571 | A1* | 3/2018  | Weinstein-Raun ......................... G05D 1/0287 |
| 2018/0136651 | A1  | 5/2018  | Levinson et al. |
| 2018/0348750 | A1  | 12/2018 | Lupa et al. |
| 2018/0364705 | A1* | 12/2018 | Yunoki ................ G05D 1/0088 |
| 2019/0346841 | A1* | 11/2019 | Litkouhi .............. G05D 1/0022 |
| 2019/0354111 | A1* | 11/2019 | Cheng ................. G05D 1/0011 |
| 2020/0033845 | A1  | 1/2020  | Park |
| 2020/0041994 | A1* | 2/2020  | Alalao .................. G08C 17/00 |

FOREIGN PATENT DOCUMENTS

KR 20190106846 A 9/2019

OTHER PUBLICATIONS

Search Report for European Patent Application No. 19205894.9; dated Feb. 6, 2020.

* cited by examiner

*Primary Examiner* — Brent Swarthout
(74) *Attorney, Agent, or Firm* — Barnes & Thornburg, LLP

(57) ABSTRACT

A method for teleoperated driving of a transportation vehicle wherein sensor data concerning an environment of the transportation vehicle are received and a computation system determines a probability for an incident affecting a control of the transportation vehicle based on the sensor data. The computation system receives quality information concerning a predicted quality of the communication network and defines at least one parameter for a teleoperation of the transportation vehicle based on the probability for the incident and on the quality information.

22 Claims, 2 Drawing Sheets

TELEOPERATED DRIVING OF A VEHICLE

PRIORITY CLAIM

This patent application claims priority to European Patent Application No. 19205894.9, filed 29 Oct. 2019, the disclosure of which is incorporated herein by reference in its entirety.

SUMMARY

Illustrative embodiments relate to a method for teleoperated driving of a transportation vehicle via a communication network, wherein the method comprises using a computation system of the transportation vehicle to receive sensor data concerning an environment of the transportation vehicle. Illustrative embodiments further relate to an electronic vehicle guidance system for a teleoperable transportation vehicle and a computer program product.

BRIEF DESCRIPTION OF THE DRAWINGS

Disclosed embodiments will be described in detail with reference to the figures, in which.

DETAILED DESCRIPTION

Figure 1:
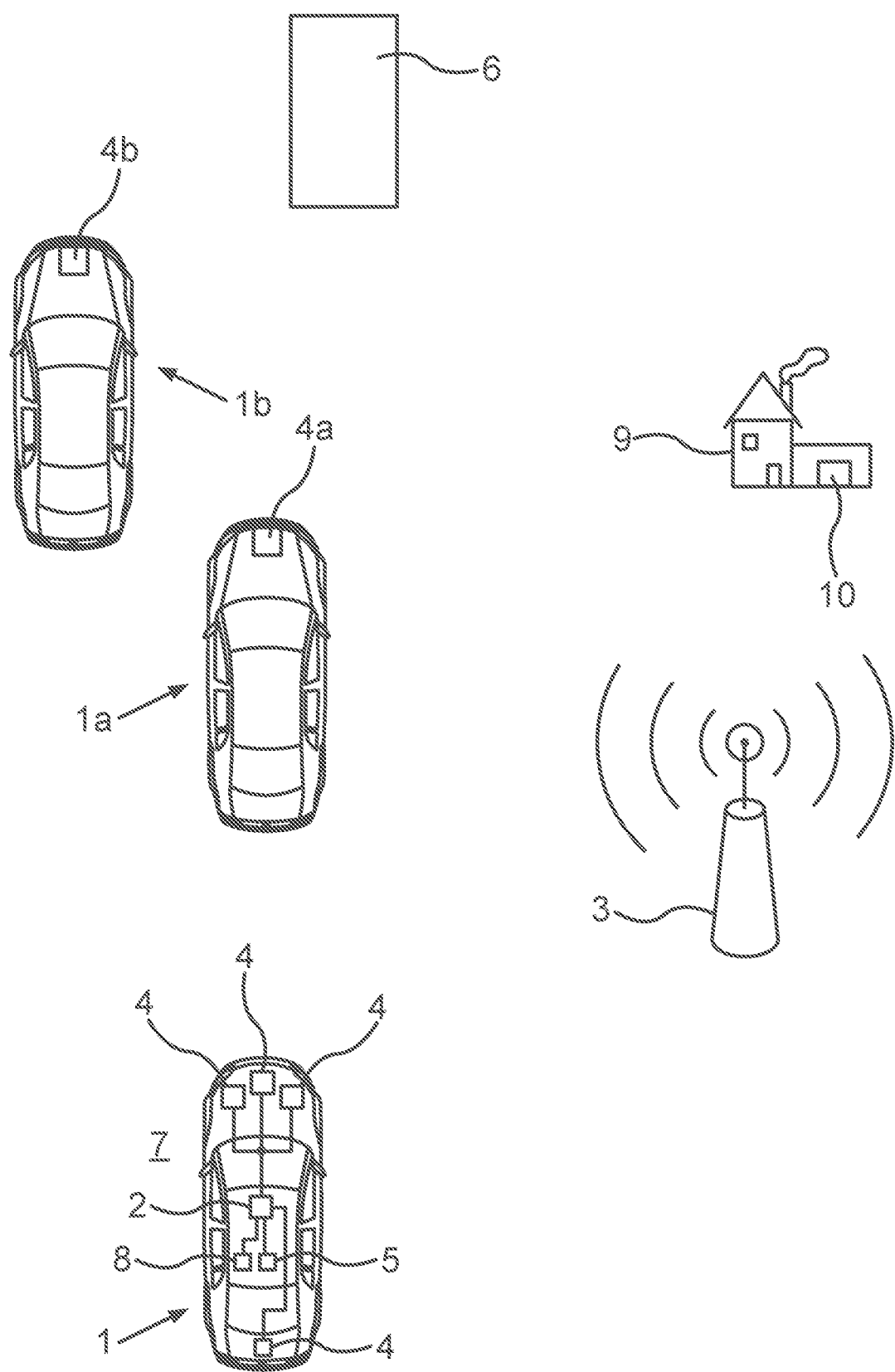
FIG. 1 shows a schematic representation of a transportation vehicle comprising an exemplary implementation of a electronic vehicle guidance system.

Teleoperated driving can be considered a potential key technology in the context of high automated or fully automated transportation vehicles. In case an automatically driven transportation vehicle is not able to interpret and solve a situation, for example, in case of an accident or a construction site, these transportation vehicles can use external instructions from a teleoperation control center. The transportation vehicle is then driven remotely from the control center.

For the remote driving, teleoperation instructions have to be transmitted from the control center to the transportation vehicle via a communication network. Consequently, in case the communications link quality of the communication network is poor, safety of the teleoperated driving can be impaired.

Document US 2018/0348750 A1 describes an approach for teleoperation of an unmanned ground transportation vehicle. In this approach, the quality of the communication channel is monitored, and, in case of low quality, for example, low available bandwidth or high latency, the amount of data transmitted from the transportation vehicle to the teleoperation operator via the network is reduced, for example, by restricting transmitted videos to a limited region of interest.

However, according to this approach, it cannot be ensured that reducing the amount of data transferred is sufficient to compensate the drop of network quality. In other words, the approach is only suitable for moderate drop of communication quality. As a result, the risk of reduced safety or security in case of a significant drop in the network quality is still high.

Document US 2018/0136651 A1 discloses a teleoperation system and a method for trajectory modification of autonomous transportation vehicles. Sensor data are received from modalities of an autonomous transportation vehicle, for example, data identifying static or dynamic objects may be derived from lidar or camera data. An object is determined to affect a planned path and a subset of trajectories are evaluated responsive to that object. Furthermore, a service platform implementing redundant communication channels to maintain reliable communications with a fleet of autonomous transportation vehicles is described. A rate of data exchanged between the autonomous transportation vehicles and the platform may be changed based on quality levels of communication over the channels. During bandwidth-constrained periods, data communications may be prioritized such that teleoperation requests from an autonomous transportation vehicle are prioritized highly to ensure delivery.

Disclosed embodiments provide an improved concept for teleoperated driving of a transportation vehicle further increasing safety or security of the teleoperation.

The improved concept is based on the idea to use a predicted quality of the communication network or a predicted quality of service QoS in combination with sensor data concerning an environment of the transportation vehicle to define at least one parameter for teleoperation of the transportation vehicle proactively, in particular, prior to an actual safety relevant incident that may occur.

According to the improved concept, a method, in particular, a computer implemented method, for teleoperated driving of a transportation vehicle via a communication network is provided. The method comprises using a computation system of the transportation vehicle to receive sensor data concerning an environment of the transportation vehicle. The computation unit is used to determine a probability for an incident affecting a control of the transportation vehicle depending on the sensor data, receive quality information concerning a predicted quality of the communication network, in particular, from the communication network and/or from a server computer, and to define at least one parameter for a teleoperation of the transportation vehicle depending on the probability for the incident and depending on the quality information.

Here and in the following, teleoperated driving of the transportation vehicle can be understood such that a control unit of the transportation vehicle, which may be comprised by the computation system, controls the transportation vehicle automatically based on teleoperation instructions, wherein the teleoperation instructions are received by the transportation vehicle, in particular, by the control unit, via a communication interface of the transportation vehicle from the communication network, in particular, from a control center or a control computer via the communication network.

The teleoperation instructions may be issued or generated by an operator operating the control computer.

The transportation vehicle is designed as a partly or fully automatically drivable transportation vehicle. The transportation vehicle may be designed as a highly automated transportation vehicle according to level 4 of the SAEJ3015 classification dated June 2018 or as a fully automated transportation vehicle according to level 5 of the SAEJ3015 classification.

The quality information concerning the predicted quality of the communication network can correspond to a predicted quality of service, PQoS, information comprise a level or a measure for a quality of service, QoS, of the communication network, for example, an expected QoS or an expected drop of QoS of the communication network.

There exist known methods for providers of communication networks to estimate or predict their QoS of the communication network and provide them via the communication network itself.

The teleoperated driving of the transportation vehicle via the communication network can be understood as the teleoperated driving being based on the teleoperation information transmitted via the communication network from the control center to the transportation vehicle.

The communication network is designed as a cellular network, in particular, as a communication network, wherein a final link between the transportation vehicle and the communication interface and the communication network is a wireless link.

The incident affecting the control of the transportation vehicle may be an incident that is de facto happening or has happened or may be an incident that is going to happen in the future with a certain probability.

The probability for the incident affecting the control of the transportation vehicle may depend on or be given by a probability for the incident to occur or, in particular, if the incident has happened or is happening already, a probability that the incident actually affects the control of the transportation vehicle.

For example, the incident may correspond to a further transportation vehicle in an environment of the transportation vehicle performing a braking maneuver. Than the probability for the incident affecting the control of the transportation vehicle can depend on the probability that the further transportation vehicle is actually going to perform the braking maneuver and/or the probability that the braking maneuver, if it occurs, affects the control of the transportation vehicle.

The incident can also comprise the presence of a construction site. The probability for the incident affecting the control of the transportation vehicle can correspond to or be given by a probability that the location or other properties of the construction site are such that the control of the transportation vehicle is actually affected.

The control of the transportation vehicle is, for example, affected by the incident, if a control action or control maneuver for controlling the transportation vehicle has to be initiated or adapted to maintain a level of safety or security.

Defining the at least one parameter for the teleoperation of the transportation vehicle comprises defining a constraint, for example, a maximum speed, for operating the transportation vehicle.

In particular, defining the at least one parameter can comprise determining the at least one parameter and optionally storing the at least one parameter, for example, temporarily.

According to a method according to the improved concept, precautions for a scenario in which the QoS of the communication network drops and, at the same time, the incident affecting the control of the transportation vehicle occurs are effectively taken by defining the at least one parameter for the teleoperation. The incident may correspond to a worst case scenario in combination with the drop of the QoS. Therefore, certain general conditions for teleoperated driving of the transportation vehicle may be defined by defining the at least one parameter.

In case of teleoperation being necessary at a time where the quality of the communication network is low, the transportation vehicle can be controlled automatically according to the at least one parameter without an explicit instruction received via the communication network.

Therefore, the transportation vehicle does not have to completely stop or drastically reduce speed, for example, to walking speed, in case of such a worst case scenario.

Therefore, a level of comfort for a user of the transportation vehicle in scenarios as described may be increased while safety of security of the teleoperated driving is still kept at a high level.

According to several implementations of the method for teleoperated driving of a transportation vehicle according to the improved concept, the transportation vehicle is partially or fully automatically driven by the computation unit during an autonomous driving mode of the transportation vehicle. The operations of receiving the sensor data, determining the probability for the incident affecting the control of the transportation vehicle, receiving the quality information and defining the at least one parameter for teleoperation can be performed during the autonomous driving mode.

According to several implementations, the control unit or the computation system is configured to initiate a teleoperated driving mode of the transportation vehicle in case a predefined scenario has occurred. During the teleoperated driving mode, the communication interface receives the teleoperation instructions from the communication network and the control unit controls the transportation vehicle automatically or remotely controlled based on the teleoperation instructions.

Also during the teleoperation mode, the operations of receiving the sensor data, determining the probability for the incident affecting the control of the transportation vehicle, receiving the quality information and defining the at least one parameter for the teleoperation may be performed.

According to several implementations, the computation system is used to determine respective probabilities for an occurrence of each of one or more potential events and to select the incident from the one or more potential events depending on the respective probabilities for the occurrence.

The events correspond to potentially ones that could in principle affect the control of the transportation vehicle.

The incident can then be selected as the worst case event.

For example, the incident can be selected depending on the probability of occurrence of the respective events and depending on a classification or a class of the respective events and/or an effect of the events and/or further parameters of the event.

According to several implementations, the computation system is used to receive first sensor data of the sensor data from a sensor system of the transportation vehicle.

According to several implementations, the first sensor data are generated by the sensor system of the transportation vehicle.

The sensor system of the transportation vehicle may comprise one or more environmental sensor systems, such as a camera, a lidar system, a radar system and/or an ultrasonic sensor system, and/or one or more initial or motion sensors configured to determine a motion parameter of the transportation vehicle, such as a longitudinal velocity, a longitudinal acceleration, a lateral velocity, a lateral acceleration and so on.

According to several implementations, the computation system is used to receive second sensor data from a vehicle-to-vehicle, V2V, interface of the transportation vehicle.

The second sensor data are generated by one or more respective sensor systems of one or more further transportation vehicles in an environment of the transportation vehicle.

By taking into account the second sensor data, collective perception may be exploited to enhance the available sensor data and consequently to achieve a higher reliability of the method.

According to several implementations, the computation system is used to determine obstacle information concerning a potential obstacle in the environment, which is involved in the incident, based on the sensor data. The computation system is used to define the at least one parameter for the teleoperation depending on the obstacle information.

The obstacle information can be determined based on one or more algorithms evaluating the sensor data, for example, comprising one or more computer vision algorithm, an algorithm for data fusion and evaluation and so far. In this way, a comprehensive assessment of the actual situation and an adequate estimation of the worst case scenario is possible.

According to several implementations, the obstacle information comprises a distance of the obstacle from the transportation vehicle and/or a velocity of the obstacle.

The velocity of the obstacle can comprise a relative velocity with respect to the transportation vehicle, or, in other words, a velocity difference between velocities of the obstacle and the transportation vehicle.

The obstacle can be a stationary obstacle, meaning that the obstacle does not or substantially not move with respect to a road the transportation vehicle is travelling on, such as a construction site.

The obstacle can also be a dynamic obstacle, meaning that the obstacle has a significant velocity with respect to the road, such as a further transportation vehicle or a pedestrian.

According to several implementations, the obstacle information comprises a class of the obstacle.

The class of the obstacle can correspond to a type of the obstacle, in other words, to semantic information assigned to the obstacle.

In particular, the computation unit can perform a classification algorithm based on the sensor data to assign a class to the obstacle.

Different types of objects can be more or less critical with respect to the control of the transportation vehicle. Therefore, the class can be a relevant indicator for the incident corresponding to the worst case scenario.

The class can concern a movement, a velocity and/or a size of the obstacle.

According to several implementations, the computation system is used to read a database to define the at least one parameter for the teleoperation, wherein the database relates the quality information and the obstacle information to the at least one parameter.

The database can be a database stored on a memory unit of the transportation vehicle, for example, the computation unit, or can be stored external to the transportation vehicle.

The database can be implemented as a look-up table.

In particular, the database contains precomputed values for the at least one parameter considering the predicted quality and the obstacle information.

In this way, low computational requirements and a high processing speed for defining the at least one parameter may be achieved.

According to several implementations, the computation system is used to define a maximum velocity for the transportation vehicle during the operation depending on the probability for the incident and on the quality information.

Thereby, safety or security may be improved, while the maximum velocity only has to be adapted as much as actually required.

According to several implementations, the predicted quality information comprises a predicted end-to-end latency of the communication network, a predicted data transmission rate of the communication network and/or a predicted packet error rate of the communication network or a combination of the quantities.

According to several implementations, the computation system is used to identify that the incident has occurred or occurs depending on further sensor data, which may be received via the V2V interface from further transportation vehicles or via the sensor system of the transportation vehicle, for example. The computation system is used to initiate a teleoperation of the transportation vehicle via the communication network and to control the transportation vehicle at least in part automatically based on the defined at least one parameter and depending on the actual quality of the communication network.

Initiating the teleoperation may comprise sending an enquiry or request to the control center vial the communication network to take over control of the transportation vehicle.

In particular, the teleoperation is initiated by the computation system via the communication interface.

The transportation vehicle is controlled by the computation system based on the definition of the at least one parameter, if the actual quality of the communication network is lower than a predefined threshold value.

According to several implementations, the computation system is used to control the transportation vehicle at least in part automatically based on the defined at least one parameter, if a value for the actual quality of the communication network is smaller than a predefined threshold value.

According to the improved concept, an electronic vehicle guidance system for a teleoperable transportation vehicle is provided. The vehicle guidance system comprises a computation system configured to receive sensor data concerning an environment of the transportation vehicle. The computation system is configured to determine a probability for an incident affecting a control of the transportation vehicle depending on the sensor data. The computation system is configured to receive quality information concerning a predicted quality of a communication network for teleoperation of the transportation vehicle. The computation system is configured to define at least one parameter for the teleoperation of the transportation vehicle depending on the probability for the incident and on the quality information.

According to several implementations, the vehicle guidance system comprises a sensor system for or of the transportation vehicle configured to generate first sensor data of the sensor data.

The sensor system is configured to be mounted in or on the transportation vehicle or is mounted in or on the transportation vehicle.

In particular, the sensor system is configured to sense an environment of the transportation vehicle for generating the first sensor data.

According to several implementations, the sensor system comprises at least one camera, at least one lidar system and/or at least one radar system.

According to several implementations, the vehicle guidance system comprises a vehicle-to-vehicle interface configured to receive second sensor data of the sensor data, in particular, from one or more further transportation vehicles in the environment of the transportation vehicle.

Further implementations of the electronic vehicle guidance system follow directly from the various implementations of the method according to the improved concept and vice versa. In particular, the vehicle guidance system according to the improved concept may be configured to or programmed to perform a method according to the improved concept or the vehicle guidance system performs or carries out a method according to the improved concept.

According to the improved concept, a transportation vehicle, in particular, an at least in part autonomously drivable transportation vehicle, comprising an electronic vehicle guidance system according to the improved concept is provided.

According to the improved concept, a computer program comprising instructions is provided. When the computer program is executed by a computer system, in particular, by an electronic vehicle guidance system according to the improved concept, for example, by the computation system of the vehicle guidance system, the instructions cause the computer system to carry out a method according to the improved concept.

According to the improved concept, a computer readable storage medium storing a computer program according to the improved concept is provided.

The computer program and the computer-readable storage medium according to the improved concept can be considered or denoted as computer program products, respectively.

In FIG. 1, a transportation vehicle 1 comprising an exemplary implementation of an electronic vehicle guidance system 7 according to the improved concept is shown.

The vehicle guidance system 7 comprises a computation system 2 and a communication interface 8 to communicate via a cellular network 3.

The vehicle guidance system 7 may further comprise a V2V interface 5 for communication between the transportation vehicle 1 and further transportation vehicles 1a, 1b in an environment of the transportation vehicle. The vehicle guidance system 7 further comprises a sensor system 4, in particular, comprising one or more environmental sensor systems.

The sensor system 4 may comprise a camera, a lidar system and/or a radar system.

The further transportation vehicles 1a, 1b may be equipped with further sensor systems 4a, 4b respectively.

In FIG. 1, also an obstacle 6 in the environment of the transportation vehicle 1 is shown schematically as well as a control center 9 comprising a server computer 10, which is able to communicate via the network 3, in particular, to communicate with the communication interface 8 via the network 3.

The control center 8 is for teleoperation of the transportation vehicle 1. In particular, if the computation system 2 sends a request via the communication interface 8 and the network 3 to the server computer 10 to take over control over the transportation vehicle 1, an operator of the control center 9 can issue teleoperation instructions and send them via the server computer 10 and the network 3 to the communication interface 8. The computation system 2 can then control the transportation vehicle 1 depending on the teleoperation instructions, such that the transportation vehicle 1 can be operated remotely by the operator.

In the following, the functionality of the vehicle guidance system 7 is explained in more detail with respect to an exemplary implementation of a method according to the improved concept.

Figure 2:
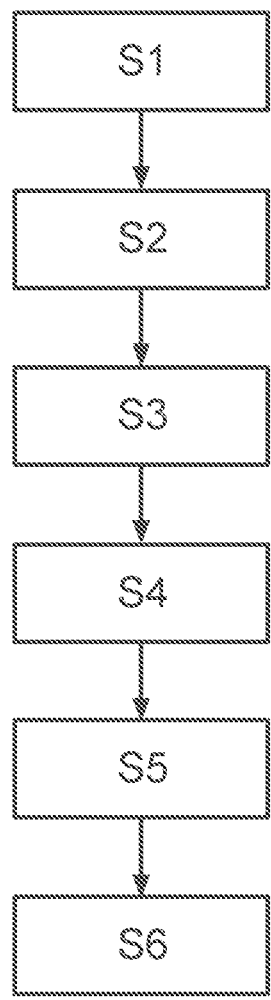
FIG. 2 shows a flow diagram of an exemplary implementation of a disclosed method.

A flow diagram of such an exemplary implementation of a method according to the improved concept is depicted in FIG. 2

In operation at S1 of the method, the computation system 2 receives via the network 3 and the communication interface 8 quality information concerning a predicted quality of the network 3, in particular, regarding a possible future drop in QoS on an end-to-end path from the transportation vehicle 1 via an uplink to the control center 9 and back via a downlink to the transportation vehicle 1. The quality information can be provided by a network operator of the network 3 or by the control center 9.

In operation at S2 the computation system receives sensor data concerning an environment of the transportation vehicle 1. The sensor data may comprise first sensor data generated by the sensor system 4 and/or may contain second sensor data received via the V2V 5, which may be implemented as a PC5 interface or a communication module according to the standard IEEE802.11p. In other words, the second sensor data represents collective perception data.

In operation at S3 the computation system 2 determines respective probability for the occurrence of a plurality of potential events that could affect the control of the transportation vehicle 1. The events may comprise a braking maneuver of one of the further transportation vehicles 1a, 1b, the presence of a construction site, occurrence of a pedestrian, an intersection, traffic lights and so far.

In operation at S4, the computation system 2 determines an obstacle information regarding one or more potential obstacles in the environment, such as the object 6 or the further transportation vehicles 1a, 1b.

The obstacle information may comprise a distance between the transportation vehicle 1 and the obstacle, respective speed or speed differences of the obstacles with respect to the transportation vehicle 1, maximum braking capabilities of the obstacle in case of the further transportation vehicles 1a, 1b and/or the probability of a speed adaption of the obstacle, in particular, in case of the further transportation vehicles 1a, 1b.

The probability of speed adaption may be considered lower in case the respective further transportation vehicle 1a, 1b has no other transportation vehicle driving in front of it.

The obstacle information can also comprise information regarding a possible or potential trajectory of the obstacle.

The obstacle information may, depending on the nature of the information, be derived from the first or from the second sensor data.

Furthermore, the computation system 2 selects or identifies a worst case incident from the one or more events.

In operation at S5, the SC 2 defines at least one parameter for a teleoperation of the transportation vehicle 1 depending on the probability for the worst case incident and depending on the quality information of the network 3.

In other words, the computation system 2 may set one or more constrains for a teleoperation session, for example, set a maximum speed for the transportation vehicle 1. This can be done based on a database of precomputed cases considering the future quality of service, the distance, speed, speed difference, maximum braking capability, probability for speed adaption and so far of the potential obstacle involved in the worst case incident.

The drop of QoS can be due to the air interface, congestion in the network, connection problems in or of the control center 9, congestion in the control center 9 and/or slow servers in the control center 9.

In operation at S6, in case the worst case incident actually occurs, and, at the same time, the QoS actually drops, the transportation vehicle 1 may be controlled by the computation system 2 depending on the defined at least one parameter for the teleoperation.

As described, according to the improved concept, situations in teleoperated driving, wherein a low network quality coincides with an incident affecting the control of the transportation vehicle can be handled to improve safety of the teleoperation and comfort for a user of the teleoperated transportation vehicle.

REFERENCE SIGNS 1 transportation vehicle
1a transportation vehicle
1b transportation vehicle
2 computation system
3 network
4 sensor system
4a sensor system
4b sensor system
5 vehicle-to-vehicle interface
6 object
7 vehicle guidance system
8 communication interface
9 control center
10 server computer
S1 method operation
S2 method operation
S3 method operation
S4 method operation
S5 method operation
S6 method operation

The invention claimed is:

1. An electronic vehicle guidance system for a teleoperable transportation vehicle, the vehicle guidance system comprising:
a computation system to receive sensor data concerning an environment of the transportation vehicle, wherein the computation system is configured to:
determine a probability for an incident affecting a control of the transportation vehicle based on the sensor data;
receive quality information concerning a predicted quality of a communication network for teleoperation of the transportation vehicle; and
define at least one parameter for the teleoperation of the transportation vehicle based on the probability for the incident and on the quality information, wherein defining the at least one parameter for the teleoperation of the transportation vehicle comprises defining a constraint for operating the transportation vehicle; and
define a maximum velocity for the transportation vehicle during the teleoperation based on the probability for the incident and on the quality information.

2. The electronic vehicle guidance system of claim 1, wherein the vehicle guidance system further comprises:
a sensor system for the transportation vehicle to generate first sensor data of the sensor data; and/or a vehicle-to-vehicle interface to receive second sensor data of the sensor data.

3. The electronic vehicle guidance system of claim 1, wherein the computation system is used to: determine respective probabilities for an occurrence of each of one or more potential events; and select the incident from the one or more potential events based on the respective probabilities for the occurrence.

4. The electronic vehicle guidance system of claim 1, wherein the computation system is used to:
receive first sensor data of the sensor data from a sensor system of the transportation vehicle; and/or
receive second sensor data from a vehicle-to-vehicle interface of the transportation vehicle.

5. The electronic vehicle guidance system of claim 1, wherein the computation system is used to:
determine obstacle information concerning a potential obstacle in the environment, which is involved in the incident, based on the sensor data; and
define the at least one parameter for the teleoperation based on the obstacle information.

6. The electronic vehicle guidance system of claim 5, wherein the obstacle information comprises a distance of the obstacle from the transportation vehicle and/or a velocity of the obstacle.

7. The electronic vehicle guidance system of claim 5, wherein the obstacle information comprises a class of the obstacle.

8. The electronic vehicle guidance system of claim 5, wherein the computation system is used to read a database to define the least one parameter for the teleoperation, wherein the database relates the quality information and the obstacle information to the at least one parameter.

9. The electronic vehicle guidance system of claim 1, wherein the predicted quality information comprises a predicted end-to-end latency of the communication network, a predicted data transmission rate of the communication network and/or a predicted packet error rate of the communication network.

10. The electronic vehicle guidance system of claim 1, wherein the computation system is used to:
identify that the incident has occurred or occurs based on further sensor data; initiate a teleoperation of the transportation vehicle via the communication network; and
control the transportation vehicle at least in part automatically based on the defined at least one parameter and based on an actual quality of the communication network.

11. The electronic vehicle guidance system of claim 10, wherein the computation system is used to control the transportation vehicle at least in part automatically based on the defined at least one parameter, in response to a value for the actual quality of the communication network being smaller than a predefined threshold value.

12. A non-transitory computer program product comprising software code including instructions that, when executed by a computer system, cause the computer system provide the functionality of the electronic vehicle guidance system of claim 1.

13. A method for teleoperated driving of a transportation vehicle via a communication network, the method comprising using a computation system of the transportation vehicle to receive sensor data concerning an environment of the transportation vehicle, wherein the computation system is used to:
determine a probability for an incident affecting a control of the transportation vehicle based on the sensor data;
receive quality information concerning a predicted quality of the communication network; and
define at least one parameter for a teleoperation of the transportation vehicle based on the probability for the incident and on the quality information, wherein defining the at least one parameter for the teleoperation of the transportation vehicle comprises defining a constraint for operating the transportation vehicle; and define a maximum velocity for the transportation vehicle during the teleoperation based on the probability for the incident and on the quality information.

14. The method of claim 13, wherein the computation system is used to:
determine respective probabilities for an occurrence of each of one or more potential events; and
select the incident from the one or more potential events based on the respective probabilities for the occurrence.

15. The method of claim 13, wherein the computation system is used to:
receive first sensor data of the sensor data from a sensor system of the transportation vehicle; and/or
receive second sensor data from a vehicle-to-vehicle interface of the transportation vehicle.

16. The method of claim 13, wherein the computation system is used to:
determine obstacle information concerning a potential obstacle in the environment, which is involved in the incident, based on the sensor data; and
define the at least one parameter for the teleoperation based on the obstacle information.

17. The method of claim 16, wherein the obstacle information comprises a distance of the obstacle from the transportation vehicle and/or a velocity of the obstacle.

18. The method of claim 16, wherein the obstacle information comprises a class of the obstacle.

19. The method of claim 16, wherein the computation system is used to read a database to define the least one parameter for the teleoperation, wherein the database relates the quality information and the obstacle information to the at least one parameter.

20. The method of claim 13, wherein the predicted quality information comprises a predicted end-to-end latency of the communication network, a predicted data transmission rate of the communication network and/or a predicted packet error rate of the communication network.

21. The method of claim 13, wherein the computation system is used to: identify that the incident has occurred or occurs based on further sensor data;
initiate a teleoperation of the transportation vehicle via the communication network; and
control the transportation vehicle at least in part automatically based on the defined at least one parameter and based on an actual quality of the communication network.

22. The method of claim 21, wherein the computation system is used to control the transportation vehicle at least in part automatically based on the defined at least one parameter, in response to a value for the actual quality of the communication network being smaller than a predefined threshold value.

* * * * *